(12) United States Patent
Tsengas

(10) Patent No.: US 7,175,069 B1
(45) Date of Patent: Feb. 13, 2007

(54) FOOD DISPENSER

(75) Inventor: Steven Tsengas, Fairport Harbor, OH (US)

(73) Assignee: Our Pet's Company, Fairport Harbor, OH (US)

( * ) Notice: Subject to any disclaimer, the term of this patent is extended or adjusted under 35 U.S.C. 154(b) by 113 days.

(21) Appl. No.: 10/688,672

(22) Filed: Oct. 20, 2003

Related U.S. Application Data

(63) Continuation-in-part of application No. 09/590,815, filed on Jun. 9, 2000, now Pat. No. 6,886,739.

(51) Int. Cl.
A47G 29/12 (2006.01)

(52) U.S. Cl. .................. 232/43.1; 119/51.01; 220/229; 221/64; 426/115

(58) Field of Classification Search ................ 232/1 A, 232/1 D, 1 R, 43.1, 44; 220/289; 150/150–151, 150/900; 119/51.01, 707–712; 222/206, 222/212, 213; 221/64–65; 426/115, 805; 383/43

See application file for complete search history.

(56) References Cited

U.S. PATENT DOCUMENTS

| 2,457,345 A * | 12/1948 | Carline ........................ 221/64 |
| 2,868,254 A * | 1/1959 | Sadd ........................... 150/151 |
| 3,063,487 A * | 11/1962 | Mullin ........................ 150/150 |
| 4,328,904 A * | 5/1982 | Iverson ....................... 220/229 |
| 4,626,457 A * | 12/1986 | Willie .......................... 150/137 |
| 4,871,093 A * | 10/1989 | Burshtain et al. ........... 222/213 |
| 4,884,717 A * | 12/1989 | Bussard et al. ............. 220/229 |
| 5,069,261 A * | 12/1991 | Ji ............................... 150/150 |
| 5,460,299 A * | 10/1995 | Prause ........................ 222/213 |
| 5,472,281 A * | 12/1995 | Phelps ......................... 383/43 |
| 5,623,980 A | 4/1997 | McMahon ................... 150/150 |
| 5,772,090 A * | 6/1998 | Rodriguez ................... 224/251 |
| 5,832,877 A * | 11/1998 | Markham ................... 119/710 |
| 5,965,182 A * | 10/1999 | Lindgren ..................... 426/104 |
| 6,176,384 B1 * | 1/2001 | Voloshin ..................... 220/253 |
| 6,361,210 B2 * | 3/2002 | Denko ......................... 383/35 |
| 6,596,328 B1 * | 7/2003 | Bezek et al. ................ 426/115 |
| 6,722,317 B2 * | 4/2004 | O'Rourke ................... 119/707 |

* cited by examiner

*Primary Examiner*—William L. Miller
(74) *Attorney, Agent, or Firm*—John D. Gugliotta

(57) ABSTRACT

A food and/or treat dispenser comprises an enclosed container having at least one aperture for insertion and dispensing of food stored therein. The dispenser comprises a top portion, a base portion and a central portion therebetween, wherein at least one aperture is provided in the top or base portion. The aperture is selectively openable and returnably resilient. A plurality of ribs are provided to facilitate selective opening of the aperture. The top and base portions include a perimeter encircling a concavity, the perimeter of a relatively flat configuration so that the top and/or base portions are positionable in a free standing configuration on a flat or planar surface.

11 Claims, 5 Drawing Sheets

US 7,175,069 B1

FOOD DISPENSER

RELATED APPLICATIONS

The present application is a Continuation-in-Part of U.S. Non-Provisional patent application Ser. No. 09/590,815, filed on Jun. 9, 2000 now U.S. Pat. No. 6,886,739.

BACKGROUND OF THE INVENTION

1. Field of the Invention

The present invention relates generally to new and novel improvements in a food and/or treat dispenser. More particularly, the present invention relates to a food and/or treat dispenser that is portable, durable and lightweight, while also providing a convenient container and dispenser for carrying, food and/or treats while walking, hiking or performing other physical activities, with or without pets.

2. Description of the Related Art

While walking, hiking or performing other physical activities, with or without the company of a pet or pets, it is often desirable to take along food and/or treats to quench brief episodes of hunger. At present, it is necessary to carry such food and/or treats in the pockets of pants, shirts or jackets, in variously sized bags, sealed containers, or within a back pack or the ever popular fanny packs. These prior art methods have disadvantages, including inconvenience in storage and transport, damaging the food and/or treats during storage and/or transport, and the resultant uncleanliness from food and/or treat residue from any left behind crumbs.

Consequently, a need is felt to provide an improved food and/or treat dispenser that conveniently permits the insertion, storage and dispensing of food and/or treats upon demand.

SUMMARY OF THE INVENTION

It is therefore an object of the present invention to provide an improved food and/or treat dispenser.

It is another object of the present invention to provide a an improved food and/or treat dispenser that is lightweight and convenient, and furthermore is capable of being operated using one hand.

It is a further feature of the present invention to provide a an improved food and/or treat dispenser that is easy to load with food and/or treats and allows such food and/or treats to be easily dispensed.

It is a further feature of the present invention to provide a an improved food and/or treat dispenser that is easily carried, attached to a user's belt or waistband, or about a user's neck via a chain or other similar means.

Briefly described according to one embodiment of the present invention, a food and/or treat dispenser comprises an enclosed container fabricated from a relatively soft pliable polymeric material having at least one aperture to permit food and/or treats to be inserted into and removed from the enclosed container. In one preferred embodiment, the food and/or treat dispenser is fabricated as an integral one-piece enclosed container having a relatively flat top portion and a relatively flat base portion opposite thereto. The relatively flat top portion includes an aperture to allow food and/or treats to be inserted into and removed from the aperture and the integral one-piece enclosed container. The relatively flat base portion also includes an aperture to allow food and/or treats to be inserted into and removed from the aperture and the integral one-piece enclosed container. The aperture in the relatively flat top portion is preferably longer than the aperture in the relatively flat base portion. If desired, a quick disconnect chain can be inserted through openings in the sidewall of the elongated cylindrical or oval central portion. As an alternative to the quick disconnect, the dispenser may also include a hook to allow the dispenser to be carried about a user's neck or wrist or attached to a belt, belt loop, waistband, pet leash handle or pet collar.

Other advantages and novel features of the present invention will become apparent in the following detailed description of the invention when considered in conjunction with the accompanying drawings.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within FIGS. 1 through 5b.

1. Detailed Description of the Figures

In the following detailed description of a preferred embodiment of the present invention, reference is made to the accompanying drawings, which in conjunction with the detailed description, illustrate and describe a preferred embodiment of a food and/or treat dispenser 10 in accordance with the present invention.

Figure 1:
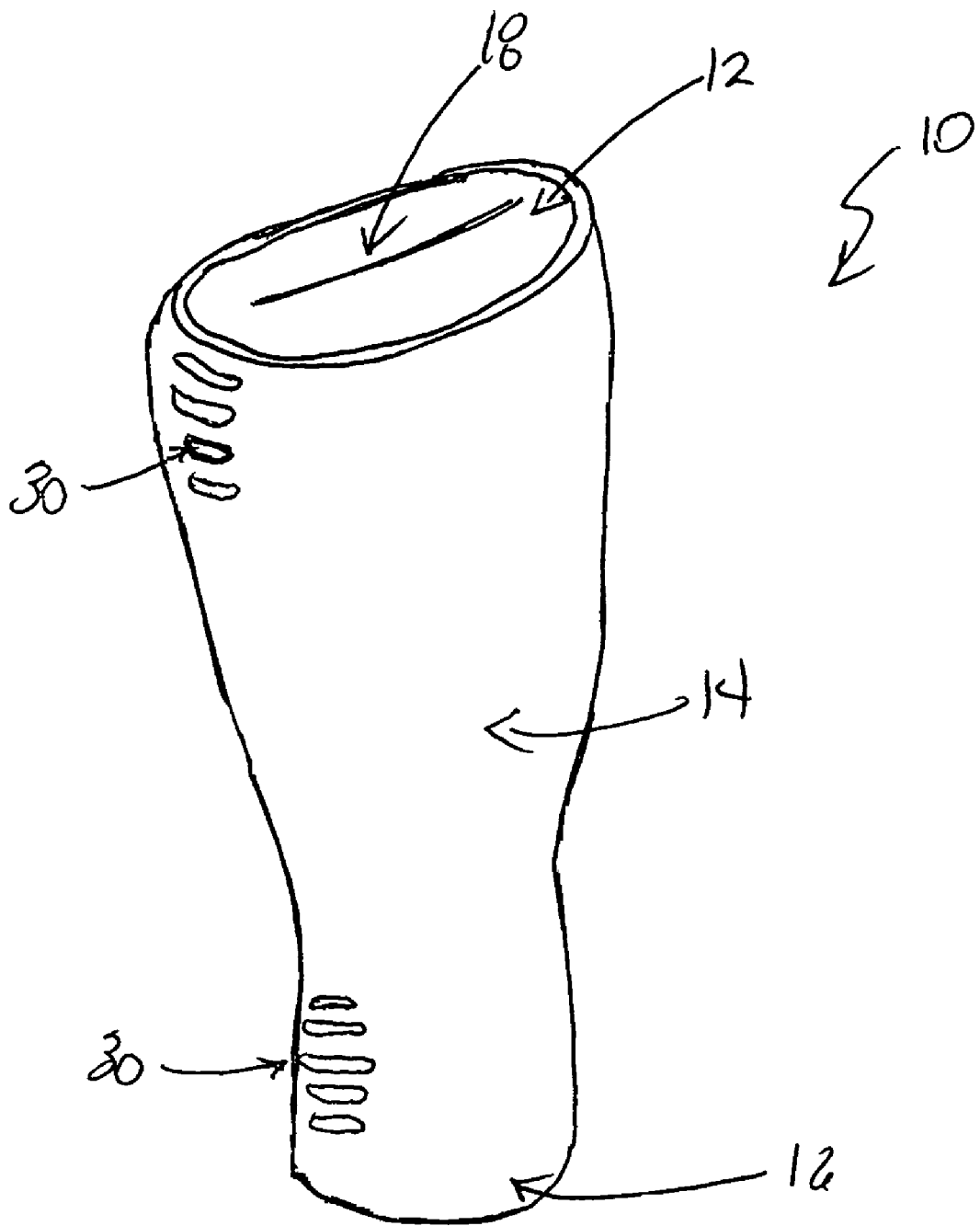
FIG. 1 is a perspective view of a food and/or treat dispenser.
Figure 2:
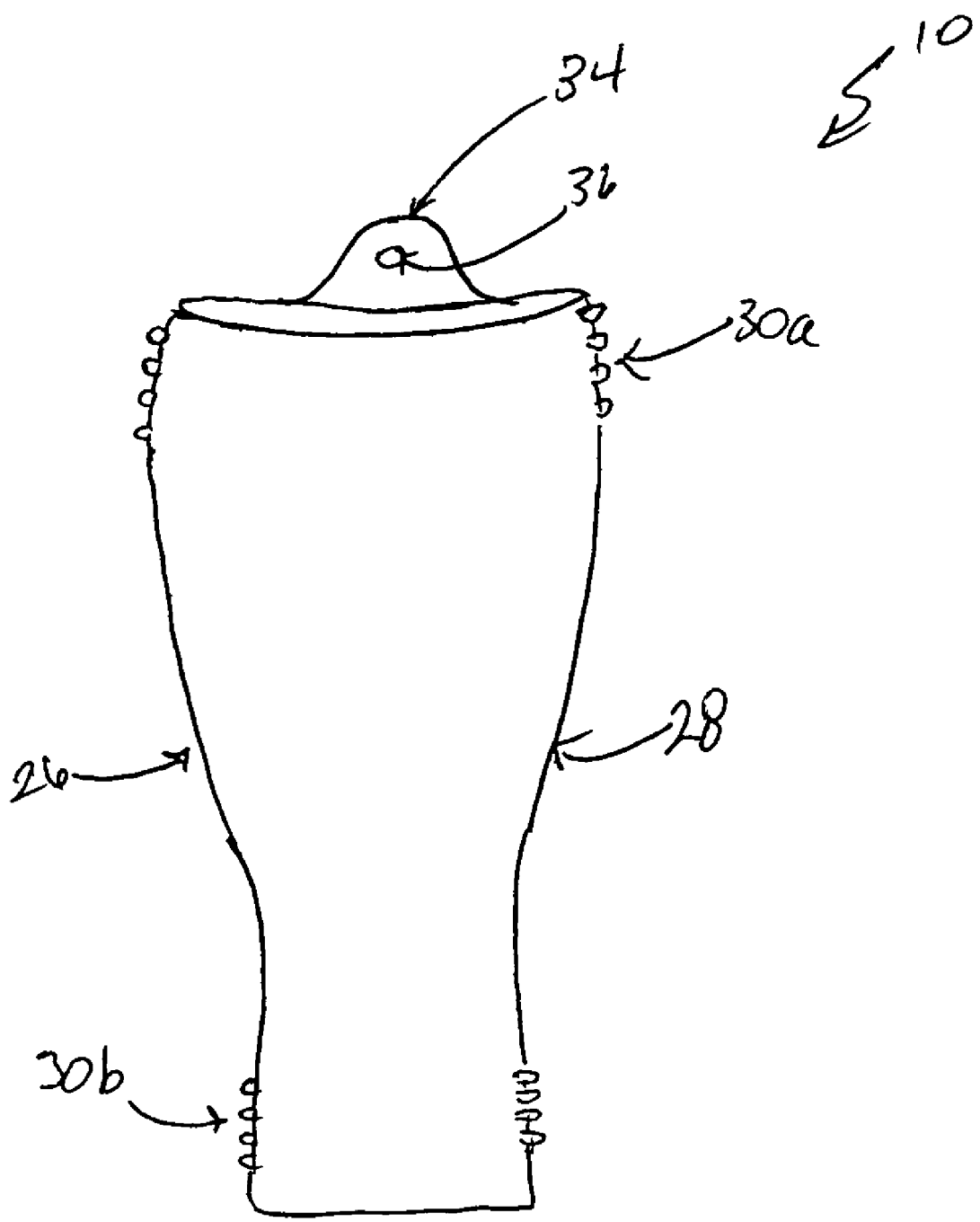
FIG. 2 is a front or rear view of the food dispenser.
Figure 3:
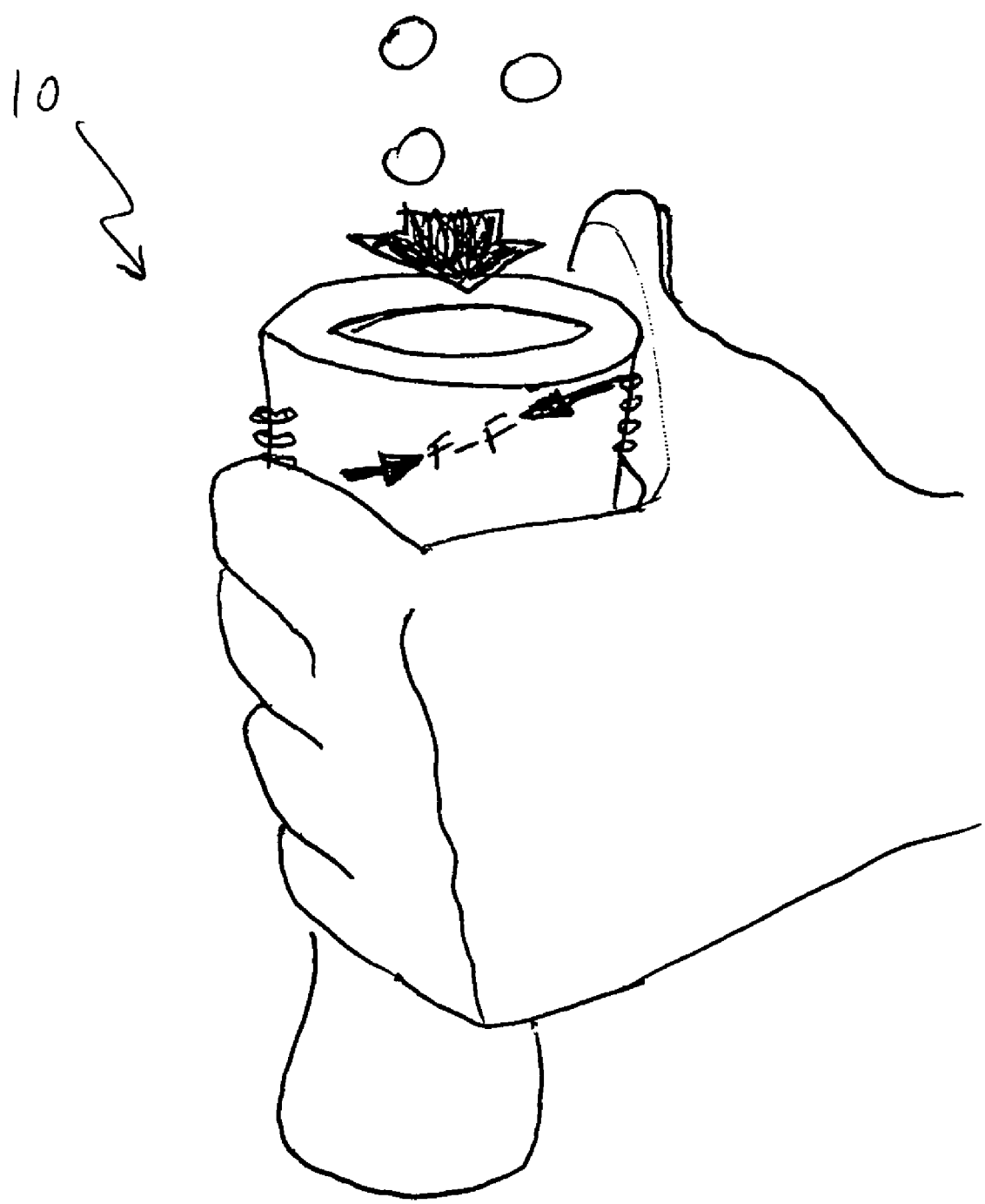
FIG. 3 is a perspective view of the food dispenser in operation.

Referring now to FIG. 1 through FIG. 3, a food and/or treat dispenser 10 (hereinafter "dispenser") is shown in accordance with a preferred embodiment of the present invention. The dispenser 10 comprises an generally and substantially enclosed container fabricated from a relatively soft pliable polymeric material. The dispenser 10 comprises at least one aperture 18 to permit food and/or treats to be inserted into and removed from the enclosed container.

More particularly, the dispenser 10 is fabricated as an integral, one-piece enclosed container comprising a relatively flat top portion 12, elongated central portion 14, and a relatively flat base portion 16. The top portion 12 preferably includes a first aperture 18 to allow food and/or treats to be inserted through the first aperture 18 into the integral one-piece enclosed container and removed therefrom. The base portion 16 preferably includes a second aperture 20 to allow food and/or treats to be inserted through the second aperture 20 into the integral one-piece enclosed container and removed therefrom. It is envisioned that the first aperture 18 has a greater length than the second aperture 20, the difference in length provided so that the envisioned insertion of food and/or treats into the container is more easily accomplished in an a timely and efficient manner, without damage to the food and/or treats, and without damage to the first aperture 18 or injury to the user's hand and/or fingers. The shorter length of the second aperture 20 is also envisioned to provide greater control to the user while dispensing food and/or treats, because the shorter second aperture 20 prevents excessive dispensing of food and/or treats. The apertures 18 and 20 are returnably resilient, returning to a closed position or arrangement when the force or pressure is released from the lateral sides 26 and/or 28 of the dispenser 10.

The top and base portions 12 and 16, respectively, are similar in structure, differing only in dimension, thus description of one portion 12 or 16 serves as a representative description of the other portion 12 or 16. The top and base portions 12 and 16 comprise a circular, oval or elliptical perimeter 22 encircling a concavity 24 in which the first or second aperture 18 or 20 resides in. For clarification, the concavity 24 of each portion 12 and 16 is defined as a concavity as if one is looking into the portions 12 and 16, and not as relative positioning (because relative positioning would require one to be defined as a concavity and the other as a convexity). The arrangement of the perimeter 22 and the concavity 24 of each portion 12 and 16 allows for each end to freely stand on a level or planar surface, such as a table. The feature of a portions 12 and 16 capable of freely standing enhances the convenience and ease of use previously disclosed, positioning the dispenser 10 at heights above the influence of tampering by pets or children, thereby preventing damage to dispenser 10, injury to pets or children, and crumbling of the food and/or treats placed therein.

The elongated central portion 14 is intermediate to the portions 12 and 16, and may include a variety of configurations, provided that the first aperture 18 of top portion 12 is of a greater length than the second aperture 20 of base portion 16. As such, it is envisioned that a number of tapered configurations may be provided to accomplish the proportionality desired between the first aperture 18 relative to the second aperture 20. The envisioned configurations include the tapered configuration depicted in the figures, but also envisioned are bell-shaped and/or conically shaped dispensers 10. The container comprises a front and rear wall and lateral sides, generally denoted as 26 and 28, respectively, (all of which are integrally configured and without definitive demarcation between walls and sides) wherein the sides 26 and 28 include a plurality of ribs 30 are provided at strategic locations adjacent to the top portion 12 and base portion 16, respectively, for facilitating opening of the respective apertures 18 and 20. Specifically, a first series of ribs 30a are positioned adjacently to the top portion 12 along the lateral sides 26 and 28, wherein a user would place a thumb at one side 26 or 28, and then the finger(s) at the opposite side 26 or 28, and by applying sufficient force, the sides 26 and 28 collapse inwardly and result in opening of the first aperture 18. A second series of ribs 30b are positioned adjacently to the base portion 16 along the lateral sides 26 and 28, wherein a user would place a thumb and finger(s) in a similar manner as to the first series of ribs 30a, and wherein application of sufficient force collapses the sides 26 and 28 and results in opening of the second aperture 20. The incorporation of the ribs 30 facilitates opening of the apertures 18 and 20, while also providing points of grasping the dispenser 10 and insuring a secure hold thereon by a user's hand(s).

Figure 4A:
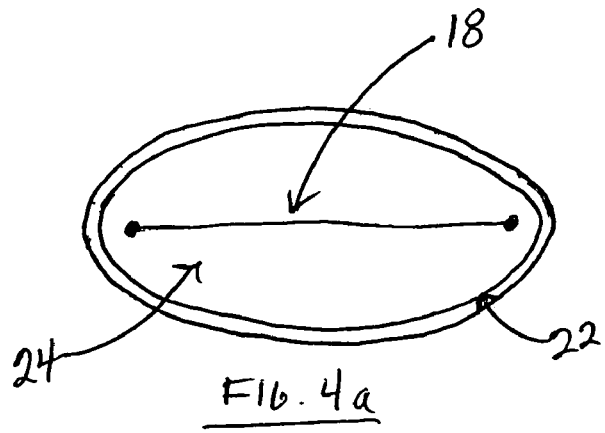
FIG. 4a is a top view of the top portion and the first aperture.
Figure 4B:
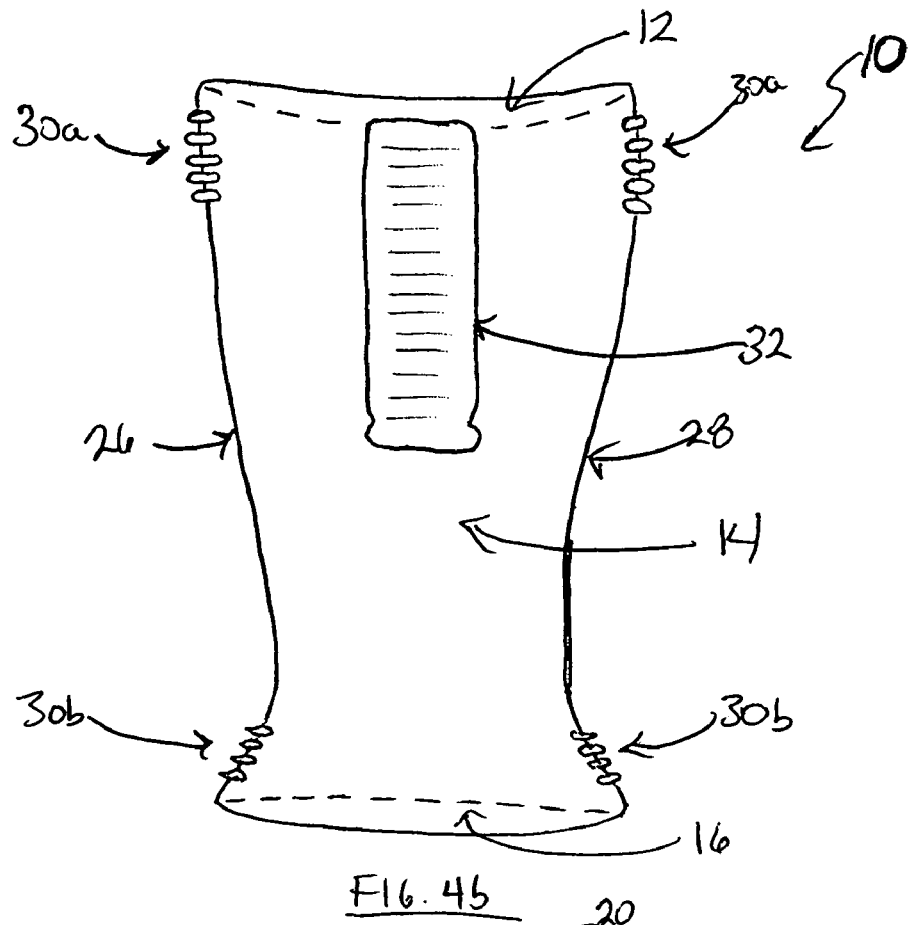
FIG. 4b is a rear view of the food dispenser illustrating the plurality of ribs and the optional clip.
Figure 4C:
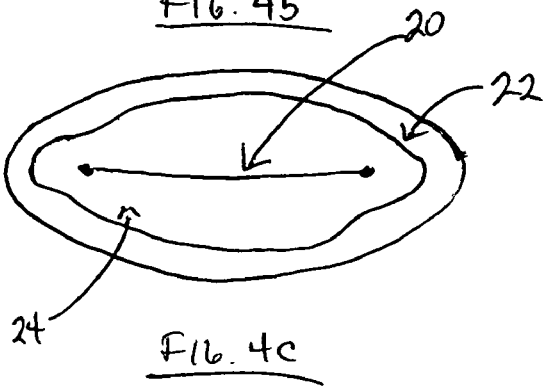
FIG. 4c is a bottom view of the base portion and the second aperture.
Figure 5A:
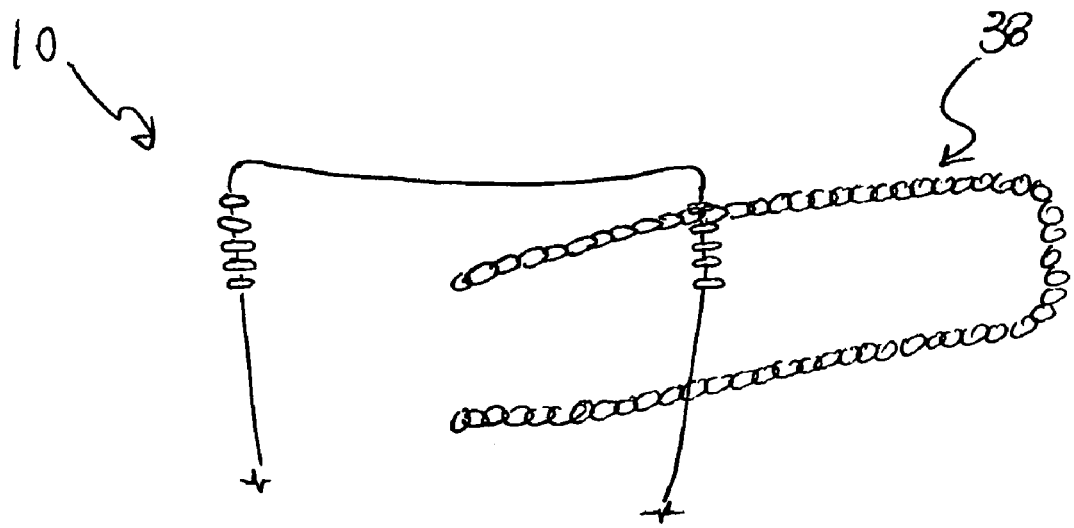
FIG. 5a is a front or rear view of the food dispenser with a quick disconnect chain permanently or semi-permanently attached thereto.
Figure 5B:
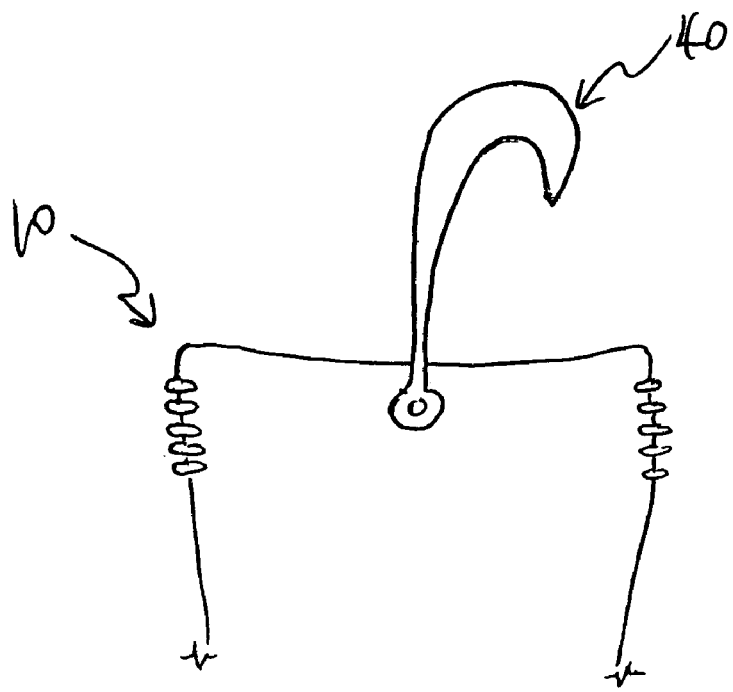
FIG. 5b is a front or rear view of the food dispenser with a hook.

A number of means may be provided to secure the dispenser 10 to an object for facilitating easier transportation. Among the means envisioned, a biased clip 32 is depicted in FIG. 4b, wherein an end of the clip 32 is affixed to the rear of the dispenser 10, and an opposite end of the clip 32 is free to move away from the dispenser 10, providing space for a waistband, belt, belt loop, pocket or other similar material and/or apparatus. Other means envisioned include a tab 34 with an orifice 36 through which a hook or wire might be inserted therethrough, and thus suspendingly securing the dispenser 10 (see FIG. 2). Yet another means envisioned includes a chain 38 (see FIG. 5a) permanently or semi-permanently affixed to the dispenser 10, providing a quick disconnect mechanism and allowing for the chain 38 to be placed about a user's neck, wrist, arm, or another similarly useful mechanism. Yet another means envisioned includes a hook 40 (see FIG. 5b) provided for attachment to a nail, edge, ledge or other similar mechanism.

2. Operation of the Preferred Embodiment

To use the present invention, in accordance with a preferred embodiment of the present invention, a user opens one of the returnably resilient apertures 18 and/or 20 by applying force or pressure to the lateral sides 26 and 28 of the dispenser 10 (as indicated by the directional arrows F—F of FIG. 3). Upon opening of the aperture 18 and/or 20, a quantity of food and/or treat is/are inserted through the aperture 18 or 20 and securely stored within the enclosed container of the dispenser 10. Because the apertures 18 and 20 are returnably resilient, once user releases the force or pressure from the lateral sides 26 and 28, the aperture 18 or 20 returns to a closed arrangement, thereby preventing egress of the food and/or treats placed therein. To dispense the stored food and/or treats, preferably, the user will apply force or pressure to the second series of ribs 30b in conjunction with the second aperture 20 (with a shorter length than the first aperture 18), thereby opening the second aperture 20 and allowing for a controlled amount of food or treats to egress from the container of dispenser 10.

The foregoing descriptions of specific embodiments of the present invention have been presented for purposes of illustration and description and are not intended to be exhaustive or to limit the invention to the precise forms disclosed. Obviously many modifications and variations are possible in light of the above teaching. The embodiments were chosen and described in order to best explain the principles of the invention and its practical application, and enable others skilled in the art to best utilize the invention and various embodiments. It is intended that the scope of the invention be defined by the Claims appended hereto and their equivalents. Therefore, the scope of the invention is to be limited only by the following claims.

What is claimed is:

1. A food dispenser comprising:
an enclosed container comprising a top portion, a base portion and a central portion intermediately therebetween, said top portion and said base portion each comprising a selectively openable and returnably resilient aperture for insertion and removal of food;
said top portion comprising a perimeter encircling a concavity, said concavity housing said aperture in said top portion;

a plurality of ribs positioned on said container, said plurality of ribs provided for facilitating selective opening of at least one of said apertures; and at least one item of food stored within said container, said at least one item of food capable of being inserted into said container and removed therefrom through at least one of said apertures.

2. A food dispenser comprising:

an enclosed container comprising a top portion, a base portion and a central portion intermediately therebetween, said top portion and said base portion each comprising selectively openable and returnably resilient aperture for insertion and removal of food;

said top portion comprising a perimeter encircling a concavity, said concavity housing said aperture in said top portion, said perimeter comprising a relatively planar configuration for placement of said top portion in a free standing position;

a plurality of ribs positioned on said container, said plurality of ribs provided for facilitating selective opening of at least one of said apertures; and at least one item of food stored within said container, said at least one item of food capable of being inserted into said container and removed therefrom through at least one of said apertures.

3. A food dispenser comprising:

an enclosed container comprising a top portion, a base portion and a central portion intermediately therebetween, said top portion and said base portion each comprising a selectively openable and returnably resilient aperture for insertion and removal of food;

said top portion having a perimeter encircling a concavity housing said aperture in said top portion; and at least one item of food stored within said container, said at least one item of food capable of being inserted into said container and removed therefrom through at least one of said apertures.

4. The food dispense as in claim 1, 2 or 3, wherein said base portion comprises a perimeter encircling a concavity, said concavity housing said aperture in said base portion.

5. The food dispenser of claim 4, wherein said perimeter of said base portion comprises a relatively planar configuration for placement of said base portion in a free standing position.

6. The food dispenser as in claim 1 or 2 wherein said central portion comprises a front wall and a rear wall opposite said front wall, and opposing lateral sides therebetween, said central portion tapered from a wide width adjacent to said top portion to a narrow width adjacent to said base portion.

7. The food dispenser of claim 6, wherein said ribs are formed on said lateral sides adjacent said aperture operating in conjunction with said top portion to selectively said aperture in said top portion.

8. The food dispenser of claim 6, wherein said ribs are formed on said lateral sides adjacent said aperture operating in conjunction with said base portion to selectively said aperture in said base portion.

9. The food dispenser of claim 1, 2 or 3, further comprising means for securing said dispenser to an object to facilitate transport of said dispenser.

10. The food dispenser of claim 1, 2 or 3, wherein said dispenser is fabricated from a relatively soft, pliable polymeric material.

11. The food dispenser as in claim 1, 2 or 3, wherein said central portion comprises a front wall and a rear wall opposite said front wall, and opposing lateral sides therebetween, said central portion tapered from a wide width adjacent to said top portion to a narrow width adjacent to said base portion.

* * * * *